F. E. CRAWFORD.
DIFFERENTIAL GEARING.
APPLICATION FILED APR. 30, 1920.

1,404,836.

Patented Jan. 31, 1922.
3 SHEETS—SHEET 1.

WITNESSES

INVENTOR
F. E. Crawford,
BY
ATTORNEYS

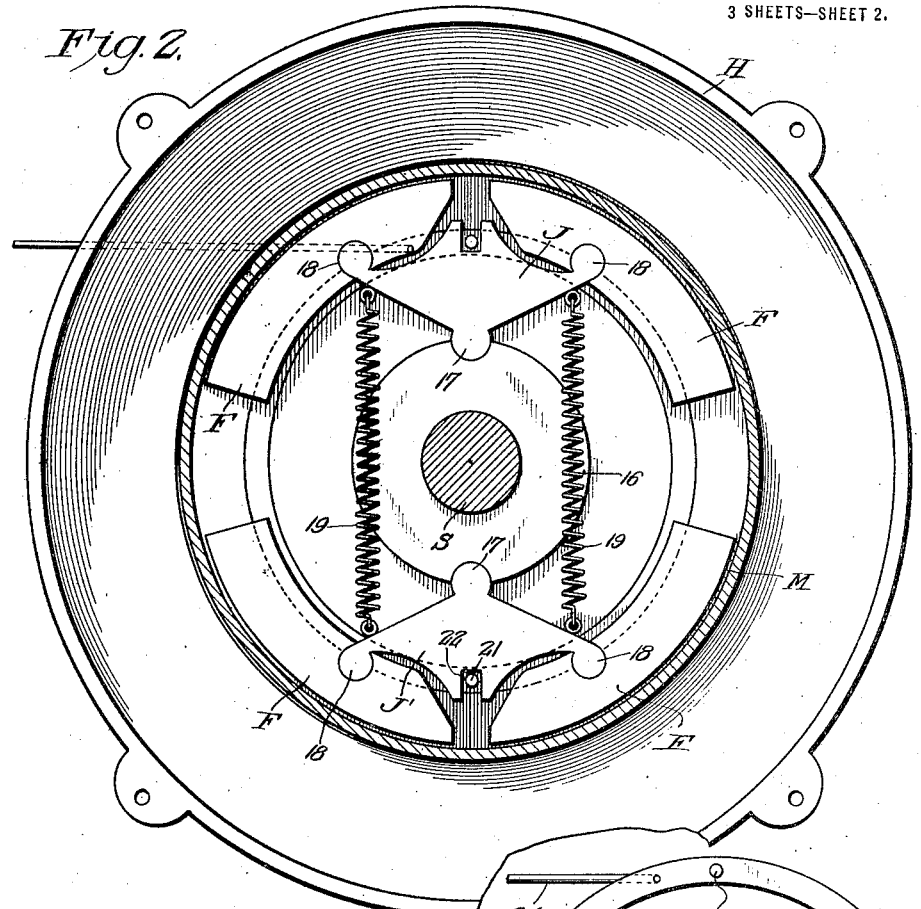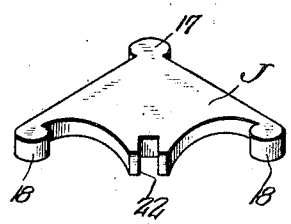

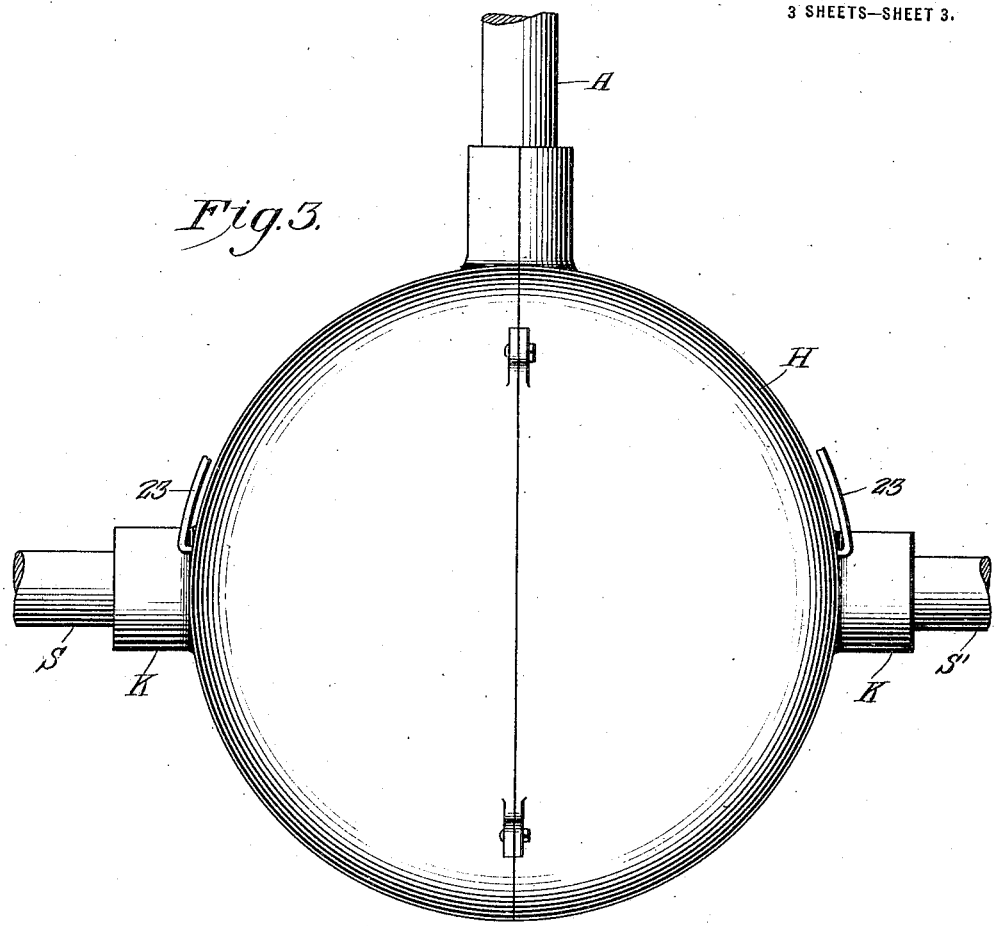
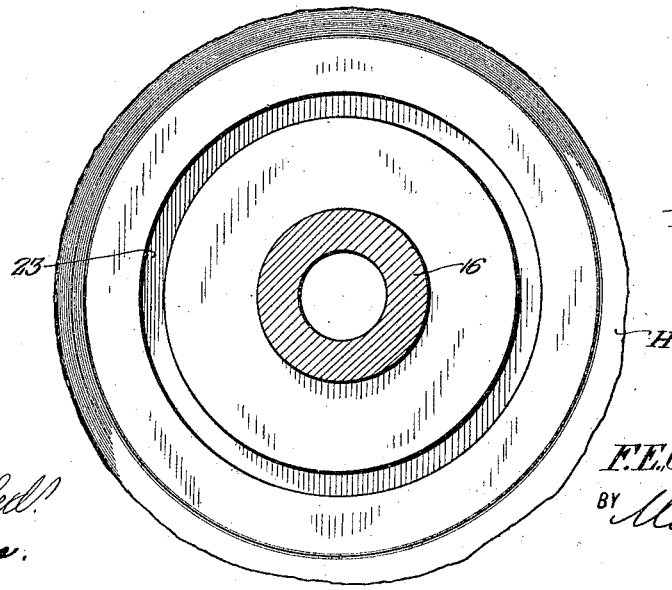

UNITED STATES PATENT OFFICE.

FRANK E. CRAWFORD, OF POTTER, NEBRASKA, ASSIGNOR OF FORTY-NINE PER CENT. TO HARRY LOVE CRAWFORD AND OSCAR LUDWIG MILLER, BOTH OF RAVENNA, NEBRASKA.

DIFFERENTIAL GEARING.

1,404,836.  Specification of Letters Patent.  Patented Jan. 31, 1922.

Application filed April 30, 1920. Serial No. 377,880.

*To all whom it may concern:*

Be it known that I, FRANK E. CRAWFORD, a citizen of the United States, and a resident of Potter, in the county of Cheyenne and State of Nebraska, have invented certain new and useful Improvements in Differential Gearing, of which the following is a specification.

In differential gearing heretofore proposed, complete differentiation is secured or entirely prevented, there being no means to restrict differentiation so as to prevent one driving wheel exceeding in speed of rotation that of the engine and thus transferring all of the driving power to the outer driving wheel. With the ordinary differential gearing, such a condition exists when an automobile is turning a corner so that the outer driving wheel merely idles while the inner wheel receives all of the power of the engine. This obviously places the entire driving strain on the inner wheel and as a result causes excessive and uneven wearing of the moving parts in addition to a loss of power as a result of this distribution.

It is the purpose of my invention to provide a differential gearing which automatically limits its scope of differentiation, neither preventing nor allowing of complete differentiation so that power is supplied to both wheels at all times. The greatest amount of differentiation necessary under any conditions is that which allows of the car turning in the smallest circle of which its steering apparatus permits. If while turning that smallest circle the inner wheel makes three revolutions and the outer wheel five revolutions, then the ratio of 3:5 is the greatest differentiation required in that car. My invention allows of this maximum differentiation and yet prohibits any greater differentiation, while at the same time permitting either wheel to act anywhere between the ratio of 3:5 while the other wheel is compensating from 5:3. It will thus be seen that differentiation is permitted and yet limited so that power is at all times applied to both wheels.

I will describe one form of differential gearing embodying my invention and will then point out the novel features thereof in claims.

In the accompanying drawings:

Figure 2 is a transverse sectional view taken on the line 2—2 of Figure 1.

Figure 3 is a view showing in top plan the gearing housing and the shaft casing.

Figure 6 is a detailed perspective view of one of the levers shown in Figure 2.

Figure 7 is a view showing in side elevation one of the actuating rings for the levers of the brake shoes.

Figure 8 is a vertical sectional view taken on the line 8—8 of Figure 1 and looking in the direction of the arrows.

Similar reference characters refer to similar parts in each of the several views.

Figure 1:
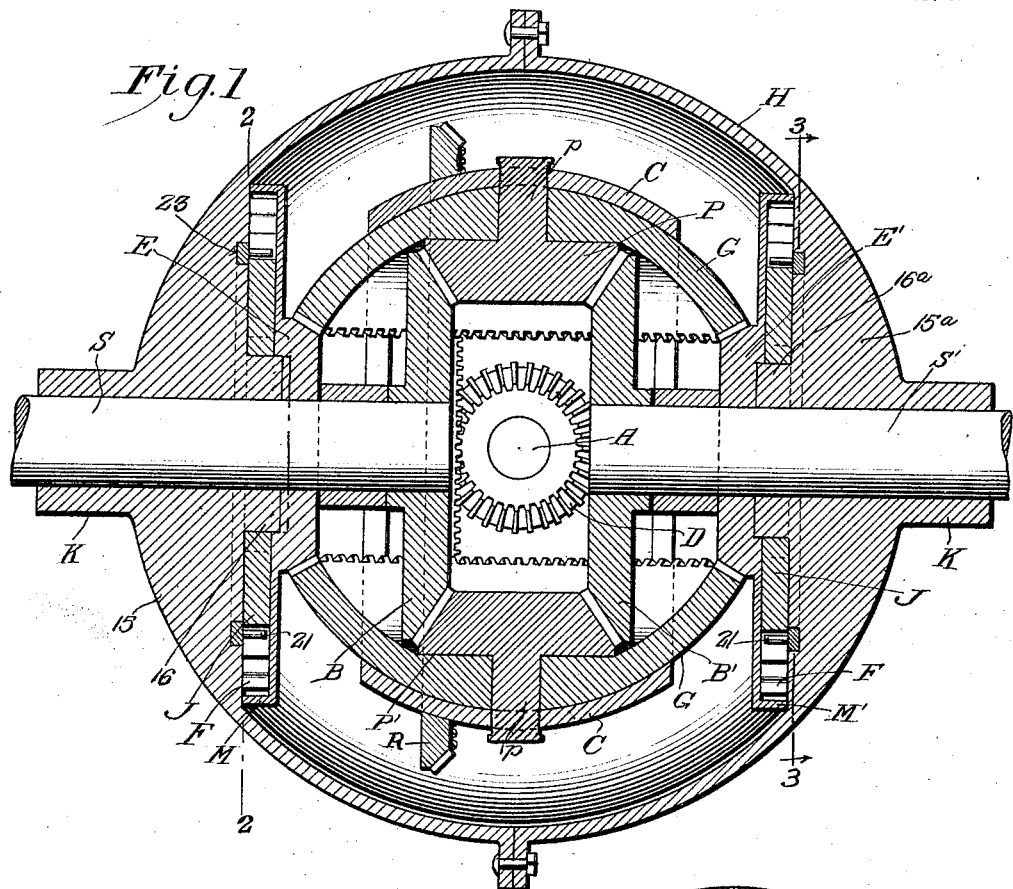
Figure 1 is a view showing in vertical section one form of differential gearing embodying my invention.
Figures 4, 5:
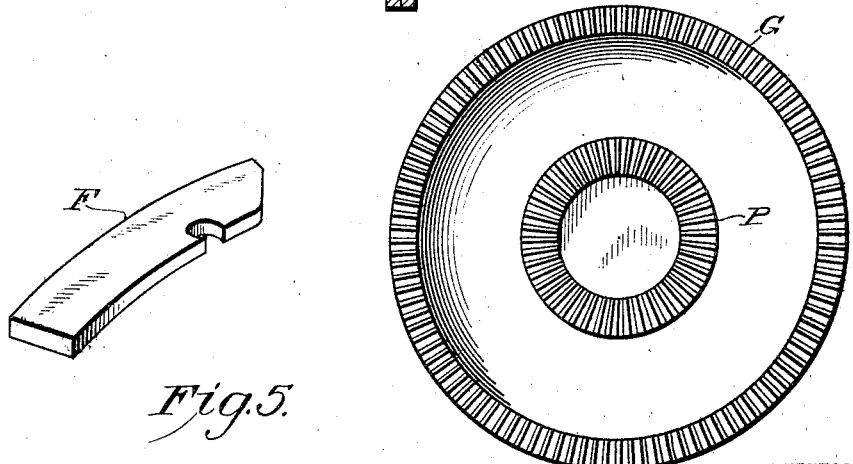
Figure 4 is a detail view of certain of the gears and pinions shown in Figure 1.
Figure 5 is a fragmentary detail perspective view of one of the brake shoes shown in Figure 2.

Referring specifically to the drawings and particularly to Figure 1, S and S' designate the two sections of the driving axle of an automobile, such axle being enclosed in a sectional casing K which includes a differential housing H. The confronting ends of the sections S and S' are spaced apart and are provided with bevel gears B and B' respectively which constantly mesh with beveled planetary pinions P and P' interposed between the two and formed with stub shafts $p$ and $p'$ which are journaled in semi-spherical gears G and G', respectively. As clearly shown in Figure 1, the semi-spherical gears G and G' are arranged in reverse relation to each other with their confronting edges formed with teeth. These gears G and G' are rotatably mounted upon the stub shafts $p$ and $p'$, the planetary pinions and the semi-spherical gears being carried by a carrier band C which encircles and embraces the gears G and G' as shown in Figure 1. The stub shafts $p$ and $p'$ are also journaled in the carrier band C with their outer ends upset for retaining the same within the pin as clearly shown in Figure 1. In Figure 4, the relative arrangement of one gear G or G' with respect to the corresponding pinion P or P' is clearly shown, this view being a detail of the two gears. The carrier band C has fixed thereto a ring gear R which is beveled and constantly meshes with a driving gear D fixed to the rear end of the driving shaft A that projects into the differential housing K in a manner which will be clearly understood.

At points where the shaft sections S and S' enter the differential housing H, the latter is formed with thickened portions 15 and 15ª upon the confronting faces of which are formed annular bosses 16 and 16ª. The bosses 16 and 16ª are partially embraced by beveled gears E and E', respectively, which constantly mesh with the semi-spherical gears G and G'. The gears E and E' have integrally formed therewith drums M and M' which are associated with the thickened portions 15 and 15ª so as to provide compartments for the reception of brake shoes F and F'. As shown in Figure 2, the brake shoes F of one drum M or M' are arranged in pairs with the shoes of each pair supported for rocking movement upon the opposite ends of levers J or J'. The levers J or J' are arranged at diametrically opposite points with respect to the corresponding boss 16 or 16ª and are rockingly mounted thereon by means of heads 17 which fit in suitable sockets formed in the boss. The opposite ends of each lever J or J' are provided with heads 18 which fit in suitable sockets formed in the brake shoes F and F' as clearly shown in Figure 2 and so that when the lever is rocked about the head 17 as a center the corresponding brake shoes will be moved into or out of engagement with the inner periphery of the drum according as the lever is rocked in one direction or the other. The two levers J and J' are biased to the positions shown in Figure 2 wherein all of the brake shoes are out of contact with the drum M, by means of coiled contractile springs 19 which are connected to the levers in the manner shown in Figure 2. This biased position of the levers J and J' I term the intermediate position, and the positions which they may occupy when rocked in one direction or the other, the two extreme positions. The levers are adapted to be simultaneously actuated so as to occupy the intermediate position or either of the two extreme positions by a ring 20, which, as illustrated to advantage in Figure 7, is provided at diametrically opposite points with pins 21 that are adapted to work within recesses 22 formed in the levers J and J', as clearly shown in Figures 2 and 6. The ring 20 in its applied position is disposed within a circular recess 23 formed in the thickened portion 15 or 15ª of the housing H, as clearly shown in Figure 8. The ring is adapted to be rotated in one direction or the other by a rod 24 which extends tangentially from the ring and exteriorly of the differential housing where it is connected to the gear shifting lever of an automobile so that it can be actuated simultaneously with the operation of the gear shifting lever. Upon rotation of the ring 20, the pins 21 engage the walls of the recesses 22 thus causing the rocking of the levers J and J' about the heads 17 as centers so that they are caused to accupy one extreme position or the other depending upon which direction the ring 20 is rotated.

From the manner in which the brake shoes F are mounted upon the levers J and J', it will be evident that in one extreme position of the levers one brake shoe of each pair will contact the drum M, while in the other extreme position of the levers, these brake shoes will be moved out of engagement with the brake drum and the remaining shoes moved into engagement with the drum. In the intermediate position of the levers neither pair of shoes contacts with the drum so that the latter is free to rotate. Because of the fact that the several brake shoes are mounted for rocking movement upon the levers, such shoes are capable of independent rocking movement so as to be moved to such a position that they will be ineffective to brake the movement of the drum when the latter is rotated in a predetermined direction. This operation will be more clearly understood from a consideration of the operation of the entire gearing.

The operation of the gearing is as follows: With the driving shaft A rotating, driving gear D effects rotation of the carrier band C through the ring gear R so that rotation of the planetary pinions P and P' with the semi-spherical gears G and G' is secured, about the driving axle as a center. Upon rotation of the pinions P and P', gears B and B' effect rotation of the shaft sections S and S' so that the driving wheels (not shown) of the vehicle which are secured to the shaft sections, are driven. During this movement, the gears G and G' rotate the gears E and E' which latter in turn effect rotation of the drums M and M' in the same direction.

Now let it be assumed that a vehicle equipped with this differential gearing is travelling forward and the levers J and J' occupy one extreme position wherein the brake shoes F and F' allow of the free rotation of the drums in the direction of rotation of the shaft sections S and S' but lock the drums against rotation in the opposite direction. When both wheels engage the ground with equal traction so that equal resistance is offered to the shaft sections, equal power will be applied to the shaft sections in the usual manner. However, when one of the wheels, say for example the wheel on the shaft section S, loses its traction as when traversing a slippery surface, the semi-spherical gears G and G' will tend to rotate about the stub shafts $p$ and $p'$ causing a retardation of the drum M'. Should its loss of traction cause it to make five revolutions while the other makes three, then the drum M' has ceased rotating. Should its tendency be to increase this ratio then the tendency of the drum M' would be to rotate rearwardly which it cannot do on account of the brake shoes which are constantly guarding against a backward motion. With the drum locked against rotation rearwardly, it is obvious that the gears E' become the fulcrum point, the axes of the gears G and G' the power, and the gear B' the resistance. Since the motion of the gears G and G' on their own axes is limited, naturally the differentiation is also limited, but the differential is not locked as it will continue to operate under these conditions in the following manner: With the gear E of a diameter equal to one half of the diameter of the gears G and G', the wheel on the shaft S' will make three revolutions while the ring gear R is making four revolutions, the wheel of the shaft S five revolutions, and the drum M eight revolutions. If loss of traction occurs of the wheel on the shaft S', then the drum M is locked against backward rotation thus forcing the left wheel to turn ahead three revolutions while the ring gear R makes four revolutions, the right wheel five revolutions and the drum M' eight revolutions.

From this operation it will be seen that irrespective of the difference in resistance offered by the two driving wheels, power is applied to both of the shaft sections so that at no time is the differentiating action complete as in the usual form of differential gearing.

The differential gearing will operate in a reverse manner to that just described when the vehicle is in reverse motion. All that is necessary is to shift the levers J and J' to their other extreme position by manipulation of the ring 20 through the medium of the rod 23 so that the brake shoes will lock the drums against forward movement to permit unrestricted movement of the same rearwardly.

Although I have herein shown and described only one form of differential gearing embodying my invention, it is to be understood that various changes and modifications may be made herein without departing from the spirit of the invention and the spirit and scope of the appended claims.

What I claim is:

1. A differential gearing comprising, shaft sections, gears fixed to the sections, planetary pinions meshing with said gears, a carrier band rotatably supporting said pinions, semi-spherical gears rotatable on said band, bevel gears rotatable on said sections and meshing with said semi-spherical gears, a ring gear fixed to said band, a driving gear meshing with said ring gear, drums carried by the bevel gears, a housing encasing all of said gears, levers fulcrumed on said housing, shoes pivoted on said levers, and manually operable means for rocking said levers to cause said shoes to occupy an intermediate position wherein they disengage said drums and two extreme positions wherein they lock said drums against rotation in either direction.

2. A differential gearing comprising, shaft sections, gears fixed to the sections, planetary pinions meshing with said gears, a carrier band rotatably supporting said pinions, semi-spherical gears rotatable on said band, bevel gears rotatable on said sections and meshing with said semi-spherical gears, a ring gear fixed to said band, a driving gear meshing with said ring gear, drums carried by the bevel gears, a housing encasing all of said gears, levers fulcrumed on said housing, shoes pivoted on said levers, and rings rotatably mounted in said housing and engageable with said levers to rock the same when the ring is rotated in either direction, whereby said shoes are caused to engage said drums to lock the latter against movement in one direction.

FRANK E. CRAWFORD.